United States Patent [19]

Goes et al.

[11] 4,317,373
[45] Mar. 2, 1982

[54] FATIGUE CYCLE SENSOR AND METHOD

[76] Inventors: Michael J. Goes, 221 Randolph Ave., Mine Hill, Dover, Morris County, N.J. 07801; John R. Masly, 534 Main St., Landing, Morris County, N.J. 07850

[21] Appl. No.: 126,803

[22] Filed: Mar. 3, 1980

[51] Int. Cl.³ .............................................. G01D 1/04
[52] U.S. Cl. ........................................ 73/787; 73/167; 73/652; 116/203; 188/374
[58] Field of Search ..................... 73/167, 133 R, 787, 73/503, 514, 11, 862.51, 649, 652; 116/203; 188/1 C

[56] References Cited

U.S. PATENT DOCUMENTS

| | | | |
|---|---|---|---|
| 2,454,793 | 11/1948 | Grogan et al. | 73/167 X |
| 3,066,540 | 12/1962 | Severance | 73/503 X |
| 3,181,821 | 5/1965 | Eddins | 188/1 C X |
| 3,263,489 | 8/1966 | Schimmel et al. | 73/167 X |
| 3,398,812 | 8/1968 | Peterson | 188/1 C |
| 3,757,900 | 9/1973 | Gischlar | 188/1 C |
| 3,979,949 | 9/1976 | Smith | 73/787 |

Primary Examiner—Charles A. Ruehl
Attorney, Agent, or Firm—Nathan Edelberg; Robert P. Gibson; A. Victor Erkkila

[57] ABSTRACT

A fatigue cycle sensor can integrate force with respect to time. The sensor has a body with a bore. A plunger is mounted in the bore for relative motion therethrough in response to force applied behind the plunger. The plunger is sized for an interference fit in the bore. This interference fit results in deformation in response to relative motion between the plunger and body. The foregoing sensor has many applications including estimating fatigue in weapons.

4 Claims, 4 Drawing Figures

4,317,373

FATIGUE CYCLE SENSOR AND METHOD

GOVERNMENT INTEREST

The present invention described herein may be manufactured, used and licensed by or for the government for governmental purposes without the payment to us of any royalties thereon.

BACKGROUND OF THE INVENTION

The present invention relates to fatigue cycle sensors and in particular to a plunger mounted in the bore of a body for an interference fit.

It is known to measure the cycles through which a machine operates by means of a numerical counter. The purpose of counting cycles is to anticipate when a part may be so fatigued as to be likely to fail. The extent to which a part is fatigued depends upon the magnitude of stress applied thereto and its duration. A disadvantage with a numerical counter is that it does not take into account any variation in the force being applied or its duration. Furthermore, for operations which are not necessarily cyclical a counter cannot be employed to estimate fatigue.

SUMMARY OF THE INVENTION

In accordance with the illustrative embodiments demonstrating features and advantages of the present invention there is provided a fatigue cycle sensor responsive to the magnitude and duration of force. This sensor has a body and a plunger. The body has a bore in which the plunger is mounted for relative motion therethrough. The plunger is arranged to move in response to force being applied behind the plunger. The plunger is sized for an interference fit in the bore. This interference fit results in deformation in response to relative motion between the plunger and body.

Accordingly, by employing the apparatus of the foregoing type, a relatively simple device is provided for estimating fatigue, which is more accurate than a numerical counter. Apparatus of the foregoing type is readily adapted to measuring the fatigue in various equipments including a gun barrel. As is well known, a gun barrel is stressed by its violently expanding propellant gas. Furthermore, this propellant gas is frequently tapped to pneumatically operate an accessory. The gun barrel and its pneumatically operated accessory its therefore stressed and fatigued in relationship to the magnitude of the propellant gas pressure and its duration. Since the foregoing apparatus can integrate force or pressure with respect to time it can obtain a measure of fatigue.

In one embodiment of the present invention, a deformable tube is internally fitted with a tapered plunger. The rear face of this plunger is exposed to the fatiguing force and is thereby driven through the deformable tube. In this embodiment the tube is deformed inelastically by the plunger. In an alternative embodiment, an extrudable plunger is fitted into the funnel shaped bore of a body. Fatiguing force applied behind the extrudable plunger causes it to funnel through the reduced-diameter portion of the bore. This mechanism is also inelastic.

In still another embodiment, a plunger which is shaped similar to a collar button has its spherical head fitted into an elastically deformable tube. Fatiguing force applied to the rear face of the plunger causes its spherical head to progressively travel down the length of the elastically deformable tube.

A significant accessory cooperating with the apparatus of the present invention is a force multiplying device which is, in a preferred embodiment, a spring-biased hammer mounted adjacent to the rear face of the plunger. This spring-biased hammer can respond to inertial forces. For example, the hammer and the plunger can be mounted on an accelerating component so that the hammer can be driven toward the plunger in response to such acceleration. In addition, for embodiments where a fatiguing pressure or force is directly applied to the hammer, the hammer accelerates toward and strikes the plunger producing an impulse force which is greater than the fatiguing force itself. In this latter sense, the hammer operates as a force multiplier.

The various embodiments of the present invention have numerous applications. For example, the above hammer and plunger can be installed on the bolt and/or bolt carrier of a weapon to measure fatigue inertially produced by accelerating the bolt or bolt carrier. Alternatively, the plunger can be coupled directly to the high pressure gun gas within a gun barrel or its pressure-operated accessory to measure fatigue.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings wherein.

DETAILED DESCRIPTION OF THE PREFERRED EMBODIMENTS

Figure 1:
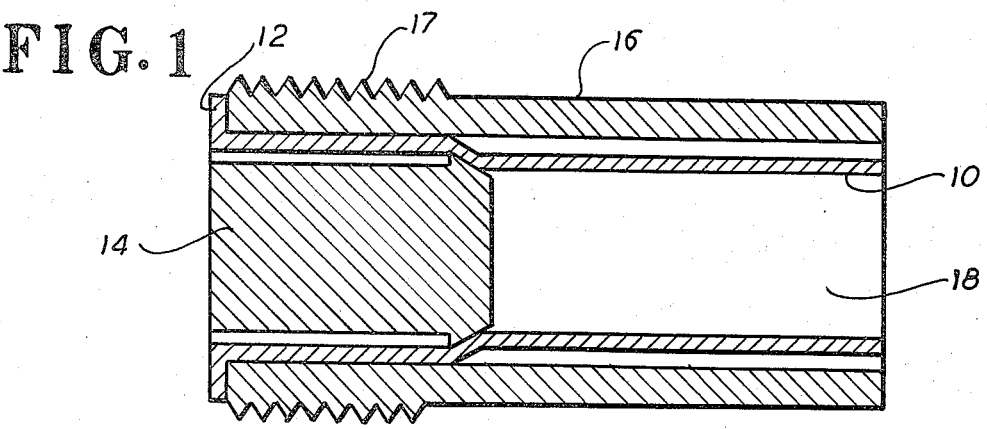
FIG. 1 is a sectional view of a fatigue cycle sensor in accordance with the present invention.

Referring to FIG. 1, it shows a body which is, in this embodiment, essentially a deformable tube 10 having a flared end shown as aft flange 12. Tube 10 is initially constructed with an aft section into which plunger 14 is mounted. It is noted that the aft portion containing plunger 14 has a larger inside diameter than the forward portion ahead of it. In this embodiment, plunger 14 has a tapered forward end and is illustrated as a cylindrical plug capped with a frustro-conical head. Since the cylindrical portion of plunger 14 has a smaller diameter than the base of its frustro-conical head, frictional forces are moderated. Body 10 is encircled by sleeve 16. In this embodiment, sleeve 16 and plunger 14 are constructed of metal and tube 10 is made of a deformable plastic, although other materials can be substituted therefor. A preferred means of mounting body 16 is shown herein as rear external threads 17.

It is to be appreciated that other shapes for body 10 and plunger 14 may be employed instead. For example, plunger 14 may be shaped as a rectangular prism or a cone fitted within a matching sleeve. It is anticipated, however, that plunger 14 will have an interference fit within bore 18. The nature of the interference fit, the thickness of the walls of tube 10, the materials used and other factors can be varied to provide the desired rate of travel of plunger 14 with respect to the forces being applied to it.

Figure 2:
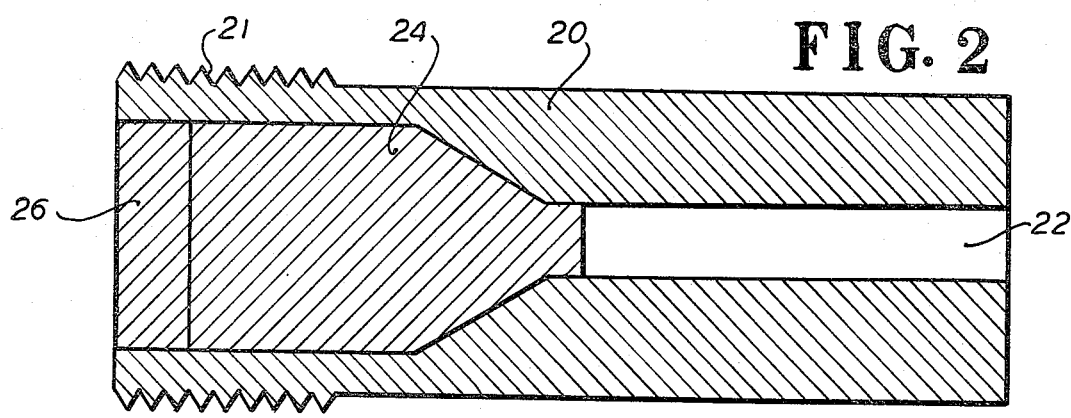
FIG. 2 is a cross-sectional view of an alternate embodiment of the fatigue cycle sensor.

Referring to FIG. 2, a sectional view of an alternate cycle sensor is given. This sensor comprises a body 20 that has a funnel-shaped bore 22. The aft end of body 20 has external threads 21. Fitted into the aft end of bore 22 is an extrudable plunger 24, which is, in this embodiment, a plastic material. Fitted behind plunger 24 is a metal pusher disc 26, which is designed to uniformly transfer forces applied behind it to plunger 24.

Figure 3:
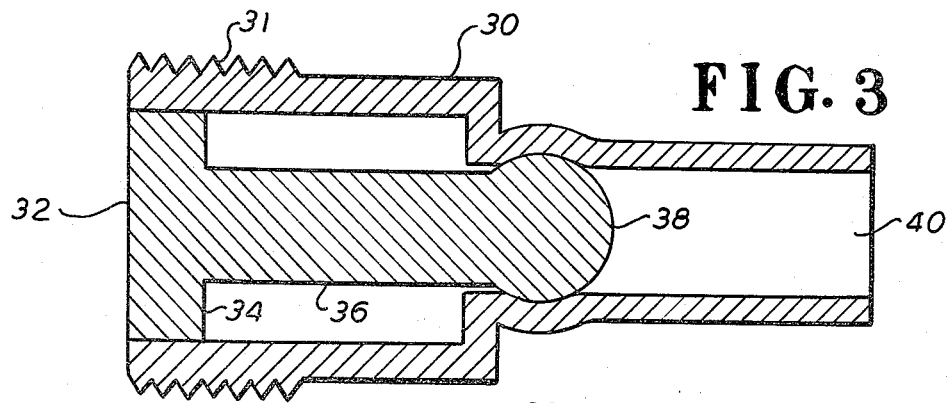
FIG. 3 is a sectional view of another alternate embodiment of the fatigue cycle sensor of the present invention.

Referring to FIG. 3, another fatigue cycle sensor is shown having elastically deformable tubular body 30. Body 30 is essentially composed of two connected cylinders wherein the forward cylinder has a reduced diameter. Fitted within the tubular body 30 is a plunger 32 having the shape of a collar button. Essentially, plunger 32 is shaped as a cylindrical disc aft section 34 from which extends a cylindrical midsection 36 to a spherical head forward section 38. Spherical head 38 is fitted within bore 40. As illustrated, head 38 deforms the forward portion of tubular body 30. In this embodiment tubular body 30 is elastic so that as spherical head 38 passes by portions of tubular body 30, these portions return to their original configuration. The spherical head forward section 38 can be replaced by another tapered forward end configuration, e.g. a frustro-conical head. Also, the midsection 36 may have other than a cylindrical configuration, e.g. it may be rectangular or cruciform in cross-section, and preferably has a diameter or size smaller than that of the bore 40 of the tube forward portion so as to reduce frictional forces.

To facilitate an understanding of the principles associated with the foregoing apparatus, the operation of the sensor of FIG. 1 will be briefly described. A fatiguing force is applied to the back surface of plunger 14. In one embodiment this fatiguing force is produced by propellant gas that is communicated to the rear face of plunger 14. In other embodiments a spring or other device can be attached to the rear face of plunger 14 to transfer to it the loading forces which may be applied to a particular part whose fatigue is to be measured.

As a result of the forces applied behind plunger 14 it is driven through tubular body 10. As it travels, plunger 14 deforms tubular body 10 by progressively increasing its diameter. The extent to which plunger 14 travels is a function of the magnitude and duration of force applied to plunger 14. Being so related, the extent of travel of plunger 14 is a relatively good measure of the fatigue of the associated component. The extent of travel of plunger 14 can be observed by inserting a depth measuring device into bore 18 or by attaching a graduated scale to the forward face of plunger 14 and observing the extent to which this graduated scale is exposed.

It is to be understood that the operation of the apparatus of FIG. 3 is similar to that of FIG. 1 except that tube 30 is deformed elastically. The operation of the apparatus of FIG. 2 is also similar except that plunger 24 is deformed instead of the body in which it is mounted. Accordingly, plunger 24 of FIG. 2 extrudes through bore 22 as a function of the magnitude and duration of force applied to pusher disc 26.

Figure 4:
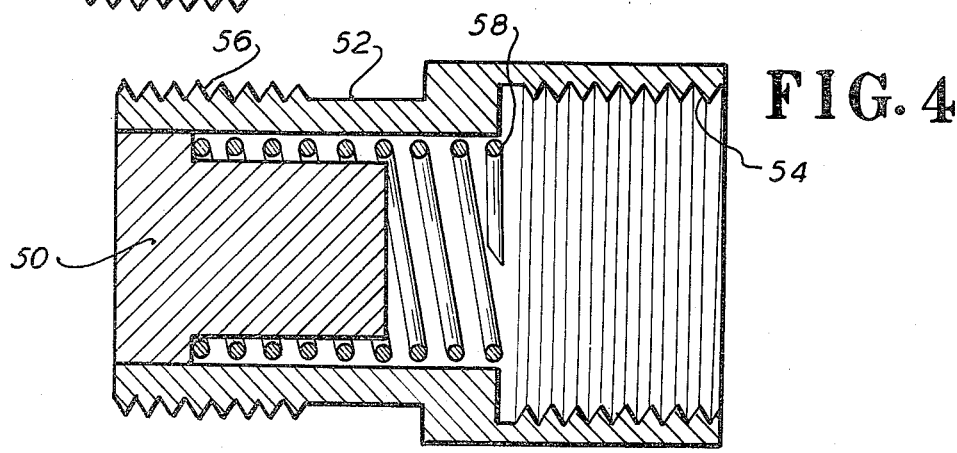
FIG. 4 is a sectional view of a device which is an accessory for the foregoing sensors.

Referring to FIG. 4, an accessory is illustrated which can cooperate with the apparatus described in FIGS. 1–3. As shown herein, a cylindrical hammer 50 is mounted within a cylindrical sleeve 52 which has forward internal threads 54 and rear external threads 56. Threads 54 and 56 may be employed as a preferred mounting means for mounting hammer 50 and also be associated plunger to an acceleratable test piece, for reasons described hereinafter. While a cylindrical hammer is illustrated, it is to be appreciated that various other shapes can be used.

The internal threads 54 are an example of a preferred means for mounting the apparatus of FIG. 4 onto the bodies of FIGS. 1–3. When so mounted these plungers are located within the confines of threads 54 of sleeve 52. A means for urging hammer 50 away from the associated plunger is shown herein as coil spring 58, although other urging devices are anticipated. Spring 58 is compressed between hammer 50 and its associated plunger.

To facilitate an understanding of the principles associated with the apparatus of FIG. 4, its operation will be briefly described. In embodiments employing the apparatus of FIG. 4, the fatiguing force to be measured may be applied directly to the rear surface of hammer 50. As with the other Figures, the fatiguing force can be obtained in several fashions. However, for this description it is assumed that the fatiguing force is obtained by applying propellant gas behind hammer 50. For such an embodiment, external threads 56 may be used to install sleeve 52 into a threaded bore hole that communicates with the inside of a gun barrel which serves as a source means for applying pressure to hammer to. Consequently, pressure applied behind hammer 50 drives it forwardly thereby compressing spring 58 against the back face of the associated plunger. Hammer 50 is accelerated to a significant velocity until it collides with the back of the associated plunger. Upon striking the plunger an impulse force is applied thereto which is significantly greater than the pressure being applied behind hammer 50. From this standpoint, hammer 50 operates as a force multiplier. After striking its plunger, hammer 50 continues to transfer the pressure on its rear face to the plunger. Consequently, the plunger is impelled forwardly by virtue of the forces applied by spring 58 and by hammer 50.

It is also anticipated that for some embodiments the sleeve 52 will be threaded onto an accelerating component. The axis of sleeve 52 will be parallel to the movement of the component. Consequently, inertial forces will tend to drive hammer 50 toward its plunger. For a situation where the component being monitored moves reciprocally, hammer 50 will also move reciprocally. Accordingly, without direct application of a force to hammer 50 it will periodically strike its plunger applying thereto a force that is a function of acceleration. Therefore, the associated plunger will be driven to an extent corresponding to the fatigue induced by acceleration of the component being measured.

It is to be appreciated that various modifications may be implemented with respect to the above described preferred embodiments. For example, various materials may be substituted depending upon the desired strength, weight, capacity etc. Furthermore, the shapes of various plungers and bodies can be altered to suit various applications. In addition, bores may be tapered, closed or vented or may be shaped to provide a non-linear relationship between movement of the plunger and fatigue.

Obviously, many other modifications and variations of the present invention are possible in light of the above teachings. It is therefore to be understood that within the scope of the appended claims, the invention may be practiced otherwise than as previously described.

What is claimed is:

1. A fatigue cycle sensor responsive to the magnitude and duration of force, comprising:
 a body including a deformable tube having an aft portion possessing an inside diameter exceeding that of a forward portion thereof and having a flared end adjacent said aft portion,
 a plunger mounted in said tube for relative motion therethrough in response to said force being applied behind said plunger, said plunger being shaped as a cylinder having a frusto-conical head possessing an outside diameter exceeding that of said cylinder of said plunger, thereby providing an interference fit in said tube resulting in deformation in response to relative motion between said plunger and said tube, and
 a sleeve encircling said deformable tube, said flared end being sized to abut and prevent slippage of said tube through said sleeve.

2. A fatigue cycle sensor responsive to the magnitude and duration of force, comprising:
 a body having a bore;
 a plunger mounted in said bore for relative motion therethrough in response to said force being applied behind said plunger, said plunger being sized for an interference fit in said bore, said interference fit resulting in deformation in response to relative motion between said plunger and body; and
 a hammer slidably mounted on said body for striking and applying said force to said plunger.

3. A fatigue cycle sensor according to claim 2 further comprising:
 means for urging said hammer away from said plunger.

4. A method for measuring the fatigue of a machine or a component thereof subject to cyclic fatigue stress forces, which comprises:
 attaching to said machine or component a fatigue cycle sensor responsive to the magnitude and duration of force, comprising:
  a body having a bore, and
  a plunger mounted in said bore for relative motion therethrough in response to said force being applied behind said plunger, said plunger being sized for an interference fit in said bore, said interference fit resulting in deformation in response to relative motion between said plunger and body,
 exposing the rear of said plunger to said cyclic fatigue stress forces to cause relative motion between said plunger and said body and effect deformation in response to said motion,
 measuring the distance of travel of said plunger through said bore resulting from deformation produced from such cyclic fatigue stress forces, and
 comparing the measured distance of travel with the distance of travel required to fatigue said machine or component to failure.

* * * * *